United States Patent
Monsheimer et al.

(10) Patent No.: US 7,060,347 B2
(45) Date of Patent: Jun. 13, 2006

(54) BENDING ELEMENT WITH BEHAVIOR DEPENDENT ON THE DIRECTION OF ROTATION

(75) Inventors: Sylvia Monsheimer, Haltern Am See (DE); Michael Beyer, Raesfeld (DE)

(73) Assignee: Degussa AG, Duesseldorf (DE)

( * ) Notice: Subject to any disclaimer, the term of this patent is extended or adjusted under 35 U.S.C. 154(b) by 178 days.

(21) Appl. No.: 10/694,937

(22) Filed: Oct. 29, 2003

(65) Prior Publication Data
US 2004/0086735 A1 May 6, 2004

(30) Foreign Application Priority Data
Oct. 29, 2002 (DE) ................................ 102 50 330

(51) Int. Cl.
| | |
|---|---|
| B32B 25/02 | (2006.01) |
| B32B 25/10 | (2006.01) |
| B32B 25/12 | (2006.01) |
| B32B 25/14 | (2006.01) |
| B32B 25/16 | (2006.01) |

(52) U.S. Cl. ................... 428/295.1; 428/297.1; 428/521; 428/522; 428/523; 440/101; 623/926

(58) Field of Classification Search .......... 428/295.1, 428/297.1, 521, 522, 523; 156/176; 623/926; 440/101
See application file for complete search history.

(56) References Cited

FOREIGN PATENT DOCUMENTS
DE 197 16 179 A1 10/1998

OTHER PUBLICATIONS

English language translation of DE 197-16-179 A1 to Baron et al., Oct. 1998.*

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

An anisotropic bending element which contains at least the following layers:
I. a reinforcing layer I, which contains a fibrous reinforcing component I with a tensile modulus of elasticity of from 1,800 to 20,000 N/mm², and
II. an elastomeric layer II with a tensile modulus of elasticity of from 2 to 1,300 N/mm²;

the component I of the reinforcing layer or layers I and the total amount of elastomer of the layer or layers II having in relation to one another a weight ratio of 1:99 to 40:60 and, in the case of bending about an axis running parallel to the reinforcing layer I, the ratio of the rigidity of the complete bending element in the case of a positive direction of rotation in relation to the rigidity in the case of a negative direction of rotation being 1:1.2 or more. The bending element can be used, for example, as an insert part for sports shoes.

46 Claims, 1 Drawing Sheet

BENDING ELEMENT WITH BEHAVIOR DEPENDENT ON THE DIRECTION OF ROTATION

BACKGROUND OF THE INVENTION

1. Field of the Invention

The invention relates to anisotropic molded parts with rigidity dependent on the direction of rotation with respect to at least one spatial direction. The molded parts absorb much higher forces in the case of a positive direction of rotation than in the case of a negative direction of rotation and, as a result, also have correspondingly higher restoring forces. The invention also relates to the use of such a molded part as an insert part for sports shoes.

2. Description of the Background

Molded parts with anisotropic rigidity are known. In DE-A 197 16 179 there is a description of molded parts which behave rigidly under the effect of forces from a direction transverse to the longitudinal direction and behave much more softly under the effect of forces from other directions. This is achieved by embedding thermoplastic strips into an elastomeric matrix.

SUMMARY OF THE INVENTION

The invention is based on the object of producing a molded part which behaves distinctly differently in the case of bending in at least one spatial direction in a positive direction of rotation than in the case of bending in a negative direction of rotation. For instance, in the case of insert parts for soccer boots, a soft behavior is required during running, in order that the front of the foot can roll, whereas a distinct support for the foot, produced by a greater rigidity of the element, is of advantage when kicking the ball, that is in the case of a reversal of the direction of rotation.

This object is achieved by a molded part in the form of an anisotropic bending element which contains at least the following layers:
  I. a reinforcing layer I, which contains a fibrous reinforcing component I with a tensile modulus of elasticity according to DIN EN ISO 527 of from 1,800 to 20,000 N/mm$^2$, preferably 12,000 to 18,000 N/mm$^2$, and also
  II. an elastomeric layer II with a tensile modulus of elasticity according to DIN EN ISO 527 of from 2 to 1,300 N/mm$^2$, preferably 80 to 800 N/mm$^2$, the component I of the reinforcing layer or layers I and the total amount of elastomer of the layer or layers II having in relation to one another a weight ratio of 1:99 to 40:60 and, in the case of bending about an axis lying in the layer, the ratio of the rigidity of the complete bending element in the case of a positive direction of rotation in relation to the rigidity in the case of a negative direction of rotation being 1:1.2 or more.

BRIEF DESCRIPTION OF THE DRAWINGS

The preferred embodiments of this invention will be described in detail with reference to the following figures.

DETAILED DESCRIPTION OF PREFERRED EMBODIMENTS

Figure 1:
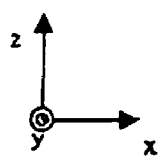
FIG. 1 shows a molded part containing two layers.
Figure 1:
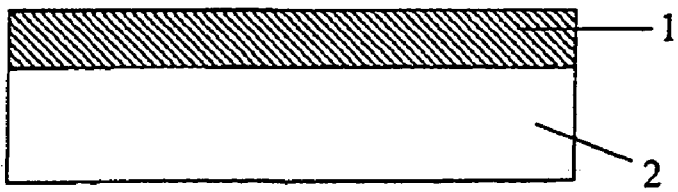

In one embodiment, the molded part comprises a layer I (1) and a layer II (2), as shown in FIG. 1. Here, however, the dependence of the rigidity on the direction of rotation can be set only by means of the profile height or material strength of the soft part (layer II) and/or the type or amount of the reinforcing component I. The ratio of the rigidity according to the direction of rotation is relatively high, but the rigidity in the softer direction may be too low for some applications, since it is determined exclusively by the soft material.

Figure 2:
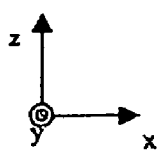
FIG. 2 shows a molded part containing three layers.
Figure 2:
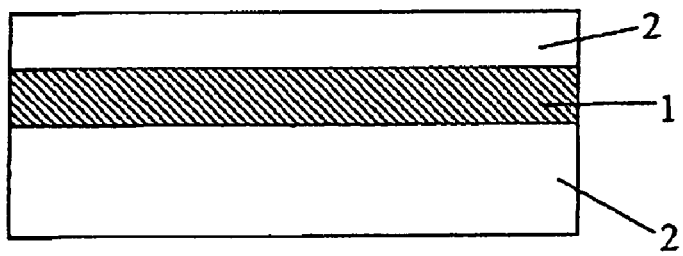

In a preferred embodiment, the molded part comprises two layers II (2), between which a layer I (1) is arranged off-center. This arrangement is shown in FIG. 2. Here, the dependence of the rigidity on the direction of rotation can be set by means of the position of the inner reinforcing layer (1). Since, however, the layer I preferably absorbs tensile forces, only one of the two layers II bears the compressive forces, depending on the direction of rotation. The construction of the elements is therefore relatively high.

Figure 3:
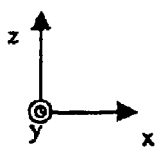
FIG. 3 shows a molded part containing four layers.
Figure 3:
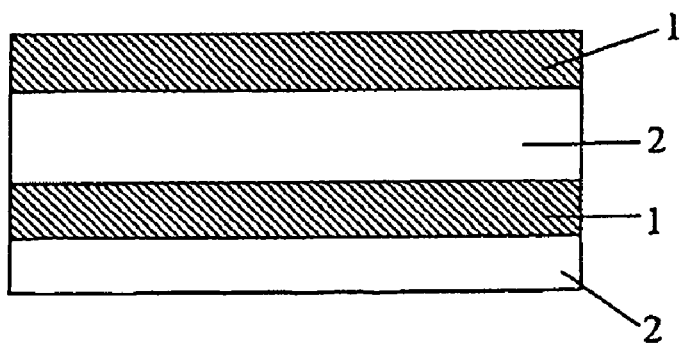

In a further preferred embodiment, the molded part comprises two layers I (1) and two layers II (2), as shown in FIG. 3. Here, with minimal overall height, the dependence of the rigidity on the direction of rotation can be set by means of the position of the inner reinforcing layer (1).

In special cases, embodiments with 5, 6, 7 or more layers are also possible, but they require an increasingly complex type of construction.

The molded parts according to the invention are generally elongate or sheet-like formations. As shown in FIGS. 1, 2 and 3, they have two axes, x and y, running parallel to the reinforcing layer I and an axis z running perpendicular to the reinforcing layer I. The term "parallel" hereby includes the possibility of the axes x and y also lying within one of the reinforcing layers I. If the bending element is an elongate formation, the x axis is generally the longitudinal axis and the y axis is the axis of rotation. If the bending element is a sheet-like formation, both the x axis and the y axis may represent the axis of rotation.

The reinforcing fibers may have any desired cross section, for example round, oval or flattened. Their diameter depends on the dimensions of the molded part; it generally lies in the range from 0.0001 mm to 2 mm and preferably in the range from 0.1 to 0.6 mm. The reinforcing fibers may contain a wide variety of materials, for example of cotton, regenerated cellulose or acetyl cellulose (rayon), polyethylene terephthalate, polybutylene terephthalate, polyethylene, polypropylene, polyamide, aramid, polyacrylonitrile, carbon, boron, steel or glass. They may be used as short, long or continuous fibers or in the form of rovings, yarns, unidirectional tapes (UD tapes), nonwovens, woven or knitted fabrics and, if appropriate, also with a wide variety of weave structures such as linen weave, twill weave or satin weave. Blended fabrics comprising different types of fiber and layer structures which are composed of different nonwovens and woven fabrics can also be used as the reinforcing component.

The elastomeric layer II contains an unvulcanized or vulcanized rubber or thermoplastic elastomer. Suitable unvulcanized rubbers are, for example, styrene-butadiene rubbers, butadiene rubber, isoprene rubber, natural rubber, isobutene-isoprene rubber, nitrile rubber, chloroprene rubber, ethylene-propylene rubber (EPM), ethylene-propylene-diene rubber (EPDM) or mixtures thereof. These rubbers or rubber compounds produced from them may be vulcanized in the molded parts to form a vulcanized rubber. All these unvulcanized rubbers and their vulcanization are well known to a person skilled in the art, so that there is no need here for a more detailed description. The precise choice of rubber depends on the application.

Likewise suitable thermoplastic elastomers are, for example, polyether ester amides, polyether amides, polyether esters, mixtures of EPM or EPDM and a polyolefin, styrene-butadiene block copolymers, which if appropriate may also be hydrogenated, thermoplastic polyurethanes, mixtures thereof or mixtures of one or more of these thermoplastic elastomers with an unvulcanized rubber. These classes of materials are also well-known to a person skilled in the art.

It is desirable within the scope of the invention if the elastomer of the layer II and the reinforcing component of the layer I adhere to each other. According to the prior art, a person skilled in the art has the following possibilities here:

choice of materials which are known to be compatible (for example PA12 as the reinforcement and polyether ester amide or polyether amide based on PA12 as the elastomer; PA11 as the reinforcement and polyether ester amide or polyether amide based on PA11 as the elastomer and corresponding combinations based on other polyamides, such as for example PA6 or PA612);

modification of one component, usually the elastomer component, by polymerizing in or grafting on a compound with a reactive group, for example maleic anhydride;

use of an adhesion promoter.

The molded parts according to the invention can be produced by various methods. Usually, the layer I is produced in a separate operation. There are a range of methods which can be used to obtain reinforcing elements in which the reinforcing fibers are wetted well and enclosed securely by the elastomer. Of these methods, the following may be mentioned by way of example:

a) The reinforcing fibers in their respective form of application (for example rovings, woven or knitted fabrics, UD tapes) are impregnated with a solution of the elastomer, the solvent is vaporized and, at the same time or subsequently, the reinforcing element is given its form, for example by a pressing operation at elevated temperature.

b) The reinforcing fibers in their respective form of application and thin films of the thermoplastic elastomer are placed alternately one on top of the other, and the laminate is deformed under pressure and at elevated temperature in an autoclave or a press.

c) A powder of the thermoplastic elastomer is scattered onto the reinforcing fibers in their respective form of application, advantageously a nonwoven, woven or knitted fabric, whereupon the fibers with the adhering powder are passed through a heating zone, preferably through an infrared oven, where the polymer powder melts and firmly adheres to the fibers. The prepreg produced in this way is cooled by means of a calender and can then be brought into the desired form, for example in a press at elevated temperature.

d) Rovings can be processed by initially being spread and in this state wetted with the powder of the elastomer in a fluidized bed. After that, the wetted roving is coated with an extruded film of the same polymer. These rovings can then be processed into woven-fabric or UD prepregs, which for their part can be formed into the reinforcing element, for example in a press under pressure and at elevated temperature.

These and similar methods consequently have the common feature that, in a first step, the reinforcing layer I is produced as a prepreg.

In a second step, the prepreg is unified with the elastomer layer. This can take place, for example, by the prepreg being placed into a casting mold or injection mold and overmolded with the elastomeric matrix. As an alternative, such a molded part may also be produced by means of presses. If it is a composite comprising only two layers, the composite part produced in this way is then already finished.

If the composite part is to contain three layers—the elastomeric matrix on the outside, the reinforcing layer on the inside, but not in the center,—this overmolded part is placed again into a mold and likewise overmolded from the other side. If a reinforcing layer is also to be provided on the outside (four-layer composite part), this is likewise placed in as a prepreg, and the elastomer is injected between the two placed-in parts.

If, however, the reinforcing component is adequately coarse-fibered, it can also be pressed with the elastomer layer or layers without being processed beforehand into a prepreg. In this case, the elastomer penetrates into the interspaces between the individual fibers and fills them.

Another possibility for producing the bending element according to the invention, when using short fibers as the reinforcing component, is that a short-fiber-reinforced elastomer compound is used for producing the layer I and the molded part is produced by means of two-component injection molding.

The ratio of the rigidity of the complete bending element in the case of a positive direction of rotation in relation to the rigidity in the case of a negative direction of rotation preferably lies between 1:1.2 and 1:6, particularly preferably between 1:1.5 and 1:5 and most particularly preferably between 1:1.8 and 1:3.

The bending element may contain still further layers over the layers I and II, for instance a lacquer or varnish layer, adhesive layer or a layer of a decorative film. In addition, it may contain further structural elements, for example molded-on fastening points, for instance for introducing force.

The bending element according to the invention is used for applications in which it is bent about an axis running parallel to the reinforcing layer I both in a positive direction of rotation and in a negative direction of rotation, for example as an insert part for sports shoes, in particular soccer boots, for sports equipment such as paddles or in medical engineering, for instance for prostheses.

The disclosure of the priority document, German Patent Application No. 102 50 330.3 filed Oct. 29, 2002, is incorporated by reference herein in its entirety.

What is claimed is:

1. A sports shoe insert, comprising:
an anisotropic bending element comprising
at least one reinforcing layer I, each of which contains a fibrous reinforcing component I with a tensile modulus of elasticity in a range of from 1,800 to 20,000 N/mm$^2$; and
at least one elastomeric layer II, each of which contains an elastomer and has a tensile modulus of elasticity in a range of from 2 to 1,300 N/mm$^2$, wherein
a weight ratio in the bending element of the fibrous reinforcing component I to the elastomer is in a range of from 1:99 to 40:60; and
when the bending element is bent about an axis parallel to the reinforcing layer I, a ratio of a rigidity of the bending element in a positive direction of rotation relative to a rigidity of the bending element in a negative direction of rotation is 1: 1.2 or more;

wherein said bending element is configured to be insertable into a sports shoe.

2. The sport shoe insert as claimed in claim 1, wherein the ratio of a rigidity of the bending element in a positive direction of rotation relative to a rigidity of the bending element in a negative direction of rotation is in a range of from 1:1.2 to 1:6.

3. The sport shoe insert as claimed in claim 1, wherein the ratio of a rigidity of the bending element in a positive direction of rotation relative to a rigidity of the bending element in a negative direction of rotation is in a range of from 1:1.5 to 1:5.

4. The sport shoe insert as claimed in claim 1, wherein the ratio of a rigidity of the bending element in a positive direction of rotation relative to a rigidity of the bending element in a negative direction of rotation is in a range of from 1:1.8 to 1:3.

5. The sport shoe insert as claimed in claim 1, wherein the fibrous reinforcing component I comprises reinforcing fibers each having a diameter in a range of from 0.0001 mm to 2 mm.

6. The sport shoe insert claimed in claim 5, wherein the reinforcing fibers comprise a material selected from the group consisting of cotton, rayon, polyethylene terephthalate, polybutylene terephthalate, polyethylene, polypropylene, polyamide, aramid, polyacrylonitrile, carbon, boron, steel and glass.

7. The sport shoe insert claimed in claim 1, wherein the elastomer comprises a material selected from the group consisting of an unvulcanized rubber, a vulcanized rubber and a thermoplastic elastomer.

8. The sport shoe insert claimed in claim 1, wherein
the elastomer comprises the unvulcanized rubber; and
the unvulcanized rubber comprises a material selected from the group consisting of styrene-butadiene rubbers, butadiene rubber, isoprene rubber, natural rubber, isobutene-isoprene rubber, nitrile rubber, chioroprene rubber, ethylene-propylene rubber (EPM), ethylene-propylene-diene rubber (EPDM) and mixtures thereof.

9. The sport shoe insert as claimed in claim 1, wherein
the elastomer comprises the vulcanized rubber; and
the vulcanized rubber is produced by vulcanizing an unvulcanized rubber comprising a material selected from the group consisting of styrene-butadiene rubbers, butadiene rubber, isoprene rubber, natural rubber, isobutene-isoprene rubber, nitrile rubber, chloroprene rubber, ethylene-propylene rubber (EPM), ethylene-propylene-diene rubber (EPDM) and mixtures thereof.

10. The sport shoe insert claimed in claim 1, wherein
the elastomer comprises the thermoplastic elastomer; and
the thermoplastic elastomer comprises a material selected from the group consisting of polyether ester amides, polyether amides, polyether esters, mixtures of ethylene-propylene rubber (EPM) and a polyolefin, mixtures of ethylene-propylene-diene rubber (EPDM) and a polyolefin, styrene-butadiene block copolymers, thermoplastic polyurethanes and mixtures thereof.

11. The sport shoe insert claimed in claim 1, wherein each of the at least one elastomeric layer II adheres directly to one or more of the at least one reinforcing layer I.

12. The sport shoe insert as claimed in claim 1, further comprising an adhesive layer between one of the at least one elastomeric layer II and one of the at least one reinforcing layer I.

13. The sport shoe insert claimed in claim 1, wherein
the at least one reinforcing layer I consists of a single reinforcing layer I; and
the at least one elastomeric layer II consists of a single elastomeric layer II.

14. The sport shoe insert claimed in claim 1, wherein
the at least one elastomeric layer II comprises two elastomeric layers II; and
the at least one reinforcing layer I comprises a reinforcing layer I between and arranged off-center of the two elastomeric layers II.

15. The sport shoe insert claimed in claim 1, wherein
the at least one reinforcing layer I comprises a first reinforcing layer I and a second reinforcing layer I;
the at least one elastomeric layer II comprises a first elastomeric layer II and a second elastomeric layer II; and
the first reinforcing layer I, the first elastomeric layer II, the second reinforcing layer I, and the second elastomeric layer II are arranged in this order in the bending element.

16. The sport shoe insert as claimed in claim 1, wherein said sports shoe is a soccer boot.

17. A paddle, comprising:
an anisotropic bending element comprising
at least one reinforcing layer I, each of which contains a fibrous reinforcing component I with a tensile modulus of elasticity in a range of from 1,800 to 20,000 N/mm$^2$; and
at least one elastomeric layer II, each of which contains an elastomer and has a tensile modulus of elasticity in a range of from 2 to 1,300 N/mm$^2$, wherein
a weight ratio in the bending element of the fibrous reinforcing component I to the elastomer is in a range of from 1:99 to 40:60; and
when the bending element is bent about an axis parallel to the reinforcing layer I, a ratio of a rigidity of the bending element in a positive direction of rotation relative to a rigidity of the bending element in a negative direction of rotation is 1:1.2 or more;
wherein said bending element is configured to be part of the paddle.

18. The paddle as claimed in claim 17, wherein the ratio of a rigidity of the bending element in a positive direction of rotation relative to a rigidity of the bending element in a negative direction of rotation is in a range of from 1:1.2 to 1:6.

19. The paddle as claimed in claim 17, wherein the ratio of a rigidity of the bending element in a positive direction of rotation relative to a rigidity of the bending element in a negative direction of rotation is in a range of from 1:1.5 to 1:5.

20. The paddle as claimed in claim 17, wherein the ratio of a rigidity of the bending element in a positive direction of rotation relative to a rigidity of the bending element in a negative direction of rotation is in a range of from 1:1.8 to 1:3.

21. The paddle as claimed in claim 17, wherein the fibrous reinforcing component I comprises reinforcing fibers each having a diameter in a range of from 0.0001 mm to 2 mm.

22. The paddle as claimed in claim 21, wherein the reinforcing fibers comprise a material selected from the group consisting of cotton, rayon, polyethylene terephthalate, polybutylene terephthalate, polyethylene, polypropylene, polyamide, aramid, polyacrylonitrile, carbon, boron, steel and glass.

23. The paddle as claimed in claim 17, wherein the elastomer comprises a material selected from the group consisting of an unvulcanized rubber, a vulcanized rubber and a thermoplastic elastomer.

24. The paddle as claimed in claim 17, wherein
the elastomer comprises the unvulcanized rubber; and
the unvulcanized rubber comprises a material selected from the group consisting of styrene-butadiene rubbers, butadiene rubber, isoprene rubber, natural rubber, isobutene-isoprene rubber, nitric rubber, chloroprene rubber, ethylene-propylene rubber (EPM), ethylene-propylene-diene rubber (EPDM) and mixtures thereof.

25. The paddle as claimed in claim 17, wherein
the elastomer comprises the vulcanized rubber; and
the vulcanized rubber is produced by vulcanizing an unvulcanized rubber comprising a material selected from the group consisting of styrene-butadiene rubbers, butadiene rubber, isoprene rubber, natural rubber, isobutene-isoprene rubber, nitrile rubber, chloroprene rubber, ethylene-propylene rubber (EPM), ethylene-propylene-diene rubber (EPDM) and mixtures thereof.

26. The paddle as claimed in claim 17, wherein
the elastomer comprises the thermoplastic elastomer; and
the thermoplastic elastomer comprises a material selected from the group consisting of polyether ester amides, polyether amides, polyether esters, mixtures of ethylene-propylene rubber (EPM) and a polyolefin, mixtures of ethylene-propylene-diene rubber (EPDM) and a polyolefin, styrene-butadiene block copolymers, thermoplastic polyurethanes and mixtures thereof.

27. The paddle as claimed in claim 17, wherein each of the at least one elastomeric layer II adheres directly to one or more of the at least one reinforcing layer I.

28. The paddle as claimed in claim 17, further comprising an adhesive layer between one of the at least one elastomeric layer II and one of the at least one reinforcing layer I.

29. The paddle as claimed in claim 17, wherein
the at least one reinforcing layer I consists of a single reinforcing layer I; and
the at least one elastomeric layer II consists of a single elastomeric layer II.

30. The paddle as claimed in claim 17, wherein
the at least one elastomeric layer II comprises two elastomeric layers II; and
the at least one reinforcing layer I comprises a reinforcing layer I between and arranged off-center of the two elastomeric layers II.

31. The paddle as claimed in claim 17, wherein
the at least one reinforcing layer I comprises a first reinforcing layer I and a second reinforcing layer I;
the at least one elastomeric layer II comprises a first elastomeric layer II and a second elastomeric layer II; and
the first reinforcing layer I, the first elastomeric layer II, the second reinforcing layer I, and the second elastomeric layer II are arranged in this order in the bending element.

32. A prosthesis, comprising:
an anisotropic bending element comprising
at least one reinforcing layer I, each of which contains a fibrous reinforcing component I with a tensile modulus of elasticity in a range of from 1,800 to 20,000 N/mm$^2$; and
at least one elastomeric layer II, each of which contains an elastomer and has a tensile modulus of elasticity in a range of from 2 to 1,300 N/mm$^2$, wherein
a weight ratio in the bending element of the fibrous reinforcing component I to the elastomer is in a range of from 1:99 to 40:60; and
when the bending element is bent about an axis parallel to the reinforcing layer I, a ratio of a rigidity of the bending element in a positive direction of rotation relative to a rigidity of the bending element in a negative direction of rotation is 1:1.2 or more;
wherein said bending element is configured to be part of the prosthesis.

33. The prosthesis as claimed in claim 32, wherein the ratio of a rigidity of the bending element in a positive direction of rotation relative to a rigidity of the bending element in a negative direction of rotation is in a range of from 1:1.2 to 1:6.

34. The prosthesis as claimed in claim 32, wherein the ratio of a rigidity of the bending element in a positive direction of rotation relative to a rigidity of the bending element in a negative direction of rotation is in a range of from 1:1.5 to 1:5.

35. The prosthesis as claimed in claim 32, wherein the ratio of a rigidity of the bending element in a positive direction of rotation relative to a rigidity of the bending element in a negative direction of rotation is in a range of from 1:1.8 to 1:3.

36. The prosthesis as claimed in claim 32, wherein the fibrous reinforcing component I comprises reinforcing fibers each having a diameter in a range of from 0.0001 mm to 2 mm.

37. The prosthesis as claimed in claim 36, wherein the reinforcing fibers comprise a material selected from the group consisting of cotton, rayon, polyethylene terephthalate, polybutylene terephthalate, polyethylene, polypropylene, polyamide, aramid, polyacrylonitrile, carbon, boron, steel and glass.

38. The prosthesis as claimed in claim 32, wherein the elastomer comprises a material selected from the group consisting of an unvulcanized rubber, a vulcanized rubber and a thermoplastic elastomer.

39. The prosthesis as claimed in claim 32, wherein
the elastomer comprises the unvulcanized rubber; and
the unvulcanized rubber comprises a material selected from the group consisting of styrene-butadiene rubbers, butadiene rubber, isoprene rubber, natural rubber, isobutene-isoprene rubber, nitrile rubber, chloroprene rubber, ethylene-propylene rubber (EPM), ethylene-propylene-diene rubber (EPDM) and mixtures thereof.

40. The prosthesis as claimed in claim 32, wherein
the elastomer comprises the vulcanized rubber; and
the vulcanized rubber is produced by vulcanizing an unvulcanized rubber comprising a material selected from the group consisting of styrene-butadiene rubbers, butadiene rubber, isoprene rubber, natural rubber, isobutene-isoprene rubber, nitrile rubber, chloroprene rubber, ethylene-propylene rubber (EPM), ethylene-propylene-diene rubber (EPDM) and mixtures thereof.

41. The prosthesis as claimed in claim 32, wherein
the elastomer comprises the thermoplastic elastomer; and
the thermoplastic elastomer comprises a material selected from the group consisting of polyether ester amides, polyether amides, polyether esters, mixtures of ethylene-propylene rubber (EPM) and a polyolefin, mixtures of ethylene-propylene-diene rubber (EPDM) and a polyolefin, styrene-butadiene block copolymers, thermoplastic polyurethanes and mixtures thereof.

42. The prosthesis as claimed in claim 32, wherein each of the at least one elastomeric layer II adheres directly to one or more of the at least one reinforcing layer I.

43. The prosthesis as claimed in claim 32, further comprising an adhesive layer between one of the at least one elastomeric layer II and one of the at least one reinforcing layer I.

44. The prosthesis as claimed in claim 32, wherein
the at least one reinforcing layer I consists of a single reinforcing layer I; and
the at least one elastomeric layer II consists of a single elastomeric layer II.

45. The prosthesis as claimed in claim 32, wherein
the at least one elastomeric layer II comprises two elastomeric layers II; and
the at least one reinforcing layer I comprises a reinforcing layer I between and arranged off-center of the two elastomeric layers II.

46. The prosthesis as claimed in claim 32, wherein
the at least one reinforcing layer I comprises a first reinforcing layer I and a second reinforcing layer I;
the at least one elastomeric layer II comprises a first elastomeric layer II and a second elastomeric layer II; and
the first reinforcing layer I, the first elastomeric layer II, the second reinforcing layer I, and the second elastomeric layer II are arranged in this order in the bending element.

* * * * *